United States Patent [19]

Parsons

[11] 4,090,682
[45] May 23, 1978

[54] PRESSURE AND HOT AIR RELIEF VENTS FOR A PRESSURIZED HOT AIR AIRSHIP

[75] Inventor: Roger R. Parsons, Sioux Falls, S. Dak.

[73] Assignee: Raven Industries, Inc., Sioux Falls, S. Dak.

[21] Appl. No.: 670,183

[22] Filed: Mar. 25, 1976

[51] Int. Cl.² .............................................. B64B 1/62
[52] U.S. Cl. ........................................ 244/99; 244/31; 244/96
[58] Field of Search ...................... 244/31, 33, 96–99, 244/30; 251/DIG. 2

[56] References Cited

U.S. PATENT DOCUMENTS

| | | | |
|---|---|---|---|
| 761,062 | 5/1904 | Delbert | 244/99 |
| 1,013,075 | 12/1911 | Scott | 251/DIG. 2 |
| 1,059,036 | 4/1913 | Coles | 244/99 |
| 1,078,455 | 11/1913 | Myers | 244/99 |
| 1,221,430 | 4/1917 | Extrand | 244/97 |
| 1,305,555 | 6/1919 | Lamont | 244/99 |
| 2,039,599 | 5/1936 | Koch | 251/DIG. 2 |
| 2,128,266 | 8/1938 | Quinn | 244/99 |
| 2,180,036 | 11/1939 | Dardel | 244/97 |
| 3,096,047 | 7/1963 | Dunn, Jr. | 244/97 |
| 3,170,658 | 2/1965 | Yost | 244/98 |
| 3,229,932 | 1/1966 | Yost | 244/31 |
| 3,860,201 | 1/1975 | Hall | 244/99 |

FOREIGN PATENT DOCUMENTS 125,429  4/1919  United Kingdom ................... 244/99

OTHER PUBLICATIONS

Cameron, *Jane's All the Worlds ' Aircraft*, p. 611, 1974–1975.

*Primary Examiner*—Galen L. Barefoot
*Attorney, Agent, or Firm*—Hill, Gross, Simpson, Van Santen, Steadman, Chiara & Simpson

[57] ABSTRACT

In a hot air airship including an elongate gas envelope aerodynamically shaped for horizontal flight with a pressure hot air generator for pressurizing the envelope and tail members on the envelope, a gondola below the envelope and power driven member for propelling the envelope horizontally, a method and structure for releasing over pressure from the airship envelope and for regulating its ascent and descent by a variably controllable first vent in the front end of the airship and a second variably controllable vent at the aft end of the airship, each of which functions to release air at a controlled rate to cause heated air to move toward either end and cause either end to ascend.

14 Claims, 3 Drawing Figures

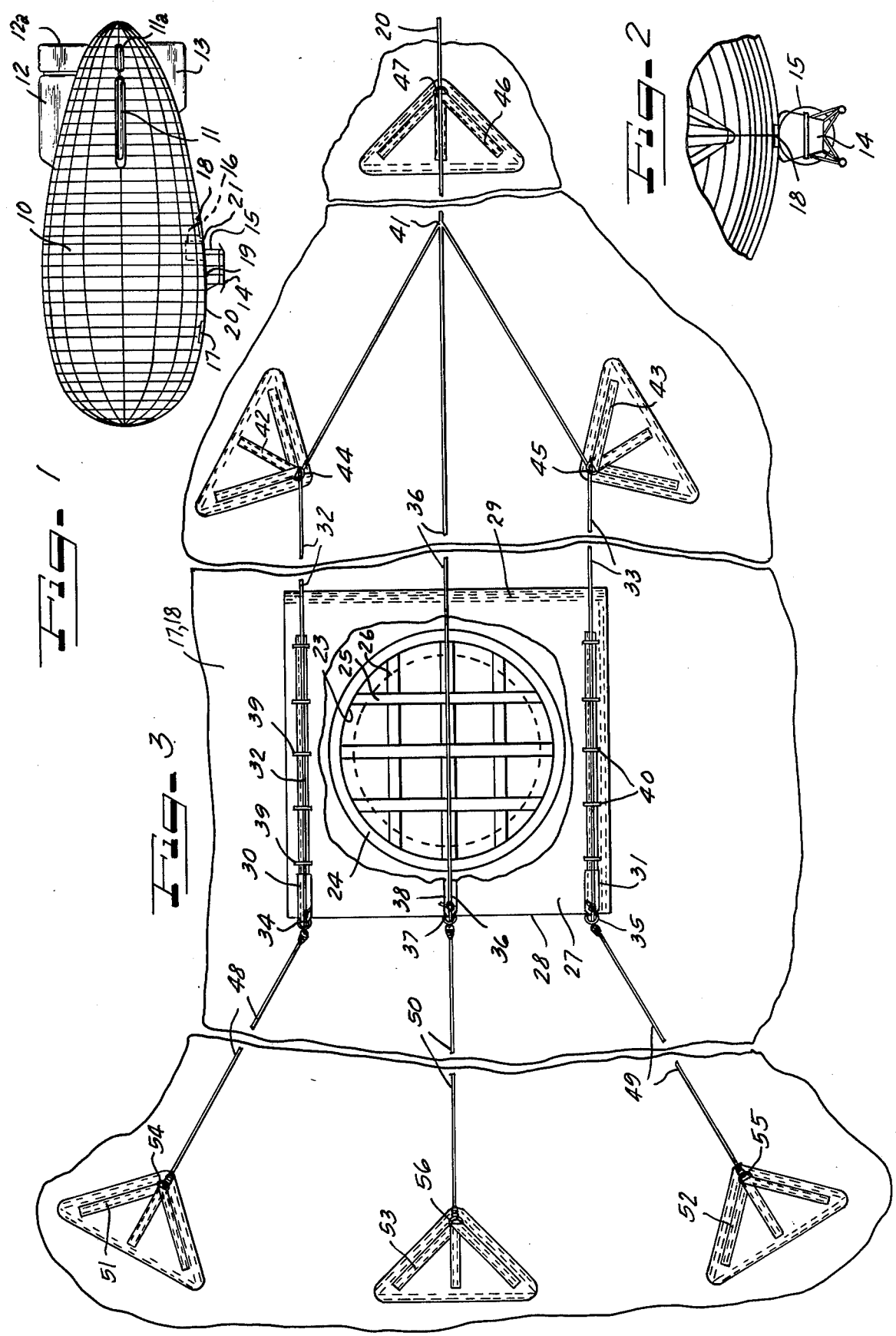

4,090,682

PRESSURE AND HOT AIR RELIEF VENTS FOR A PRESSURIZED HOT AIR AIRSHIP

BACKGROUND OF THE INVENTION

The invention relates to improvements in powered airships and more particularly to a powered airship having a flexible envelope inflated and pressurized by hot air and capable of directed flight for transporting loads over distances.

Airships of this type have been referred to as dirigibles and originally referred to as blimps when the airship is nonrigid. The present invention in particular relates to a hot air inflated airship of the nonrigid pressure type. The main envelope or pressure hull is formed of a fabric such as a laminated plastic and Dacron, or of suitable other material which is lightweight, high temperature resistant, extremely strong and impermeable to gas leakage. The envelope of the airship is horizontally elongate and is primarily symmetrical with load lines distributed over the body of the envelope for carrying a payload therebelow. The load lines are also particularly arranged to support hot gas pressure inflation means which preferably will be in the form of one or more propane fueled burners with a fan inflation means. The fan or blower which pressurizes the airship is driven by a suitable motor which may be propane or gasoline fueled. The airship carries a propelling engine and is propeller driven to travel in controlled horizontal flight.

The plastic fabric envelope when not in use can be folded and shipped or stored in the space which takes up less than 1% of its inflated volume. The envelope can be relatively rapidly inflated by the operation of the fan and the free lift is controllable by control of the burner which controls the temperature of the air within the envelope. The direction of flight is controlled by tail fins at the aft end of the airship envelope. These tail surfaces preferably include a rigid or stable portion which stabilizes the airship in horizontal flight, and a manipulable portion which changes the direction of flight. Vertically extending control surfaces are pivoted to the left or right to change the direction of flight, and horizontally extending surfaces move up or down to cause the airship to ascend or descend. Primarily, the temperature of the hot air within the airship is controlled to provide sufficient lift for the weight of the envelope and the payload being carried so that essentially free lift is present while the airship is in flight, and it ascends or descends in accordance with the change in angle of the control tail surfaces.

SUMMARY OF THE INVENTION

The features of the present invention accomplish additional control of the flight of the airship by providing a secondary means for causing the forward end or the aft end of the airship to raise, thereby causing the ship itself to ascend or descend in flight. This is accomplished by directing the heated inflating air into the balloon envelope substantially at the midportion between the fore and aft ends and generally at the center of lift of the airship. By providing controlled vent means at a location spaced forwardly of the hot air delivery and another vent means at a location spaced aft of the hot air means, the vents permit discharging air from the airship envelope which results in heated air rushing forwardly or rearwardly in the envelope to cause additional lift to the forward or aft end of the envelope. Additionally, these vents are employed as a pressure relief means for decreasing the pressure within the envelope. While they can be at any location around the circumference of the airship body, they are preferably on the lower surface so that opening them will discharge cool air from the envelope and permit a more rapid flow of heated pressurizing air into the airship. Thus, the vents can be selectively operated to release cooler air from either the forward or aft end of the airship, or both operated to relieve pressure and permit more rapid delivery of heated air to the balloon. The vents add to the overall control and coact and augment the other controlling devices including the tail fins, the blower discharge, the propelling engine, and the gas temperature control.

It is an object of the present invention to provide a power driven hot air inflated airship with improved features for controlling the internal pressure within the airship and for controlling and regulating its free lift.

A still further object of the invention is to provide a power driven traveling inflatable airship with improved control for manipulating the ascent and descent of the ship.

A further object of the invention is to provide an improved gas release port for a powered pressurized aircraft wherein the structure permits variable control of the size of the port, and the port construction does not interfere with the aerodynamic shape of the ship and provide a manhole for inspection of the interior of the ship.

Other objects, advantages and features, as well as equivalent structures and methods which are intended to be covered herein will become more apparent from the teachings of the principles of the invention in connection with the disclosure of the preferred embodiment of the specification, claims, and drawings in which:

DRAWINGS

FIG. 1 is a side elevational view of an airship constructed in accordance with the principles of the present invention;

FIG. 2 is an enlarged fragmentary view taken from the aft end of the airship; and FIG. 3 is an enlarged detailed structural view of the vent means for the airship envelope.

DESCRIPTION

As illustrated in FIGS. 1 and 2, a hot air pressurized airship envelope 10 is shown which is elongate in shape and is aerodynamically shaped for horizontal flight. The envelope is formed of material such as Dacron reinforced plastic which is temperature resistant and preferably laminated so as to form a tough outer surface and an envelope wall which is impermeable to gas leakage. The envelope is inflated by hot air, and for this purpose a fan and burner combination is located at an air intake opening shown generally at 16 at the base of the airship body. At the aft end of the airship are vertical tail surfaces 12 and 13 for stabilizing the flight of the airship, and a vertical tail fin 12a is angularly movable to control the direction of flight. Horizontal tail fins such as 11 help maintain the airship in horizontal flight, and a variable elevator fin such as 11a at each side of the airship directs the airship to ascending, descending or horizontal flight.

Suspended beneath the airship is a gondola 14 for an operator and a payload. Mounted on the airship envelope or gondola and immediately aft thereof is an engine and propeller shown generally at 15 for pushing the aircraft forwardly in horizontal flight. The pilot in the gondola will control the various devices which direct the airship in flight including the tail fin surfaces and the operating engine. The envelope is inflated to a pressure of approximately 0.6 inches of water with the hot air inside directed into the envelope at a temperature on the order of 200° F, and the operation of the fan and the temperature of the burner may be manually controlled by the pilot or at least in part automatically controlled such as by a control thermostat within the airship which regulates the flow of fuel to the burner in accordance with the temperature of the gas within.

In accordance with the present invention, vents such as illustrated at 17 and 18 are located fore and aft of the gondola. These may be anyplace on the circumference of the airship envelope, but are preferably on the lower surface. These vents can be controllably opened preferably by the pilot at a location 19, and for this purpose, vent opening control lines 20 and 21 lead back to be gripped and pulled by the pilot at the position 19. The vents may be simultaneously opened to release air from within the airship and prevent over pressurization. The release of air from the airship envelope through the vents will dump cooler air from the lower portion of the airship envelope permitting the more rapid entry of hotter air and increasing the airship lift. Generally the operation of the burner and the inflating fan 16 is such that the free lift of the airship envelope is adequate to carry the gondola and its payload and permit free controlled flight of the airship.

The hot gas inflation means is located substantially at the center of the airship midway between the fore and aft ends. The gas release vents 17 and 18 are located fore and aft of the location where the hot air is introduced into the airship. For example, on an airship envelope 120 feet in length with a gondola approximating 20 feet in length, the vents will be located 40 feet apart with the forward vent approximately 10 feet in front of the gondola, and the aft vent approximately 10 feet aft of the gondola.

Thus, when the forward vent 17 is opened, the pressurized gas from within the airship will be released into the atmosphere, and the heated gas within the envelope will flow forwardly increasing the lift in the forward end of the airship. Similarly when the aft vent 18 is opened, and pressurized air dumped into the atmosphere, the heated gas within the airship will tend to flow rearwardly increasing the lift at the aft end. These vents thus may be used to help control the ascent or descent of the airship. They may also be used complementary with the tail fin members 11a to cause the airship to ascend or descend or help trim the airship in flight. Each of the vents includes a port with a cover that moves laterally across the port to controllably vary its opening, and thereby control the rate of flow of gas from the envelope through the port.

A preferred form of vent construction is illustrated in FIG. 3, and the same construction may be used for each of the fore and aft vents so that only one detailed construction need be shown. For convenience, the vents are so constructed so that the opening lines 20 and 21 extend respectively rearwardly and forwardly from the vents for ease of operation.

The vent constructions include a circular port 23 cut through the wall of the airship envelope. The size of the ports are such that they will permit an escape of heated air to the atmosphere at a rate at least equal to the delivery of the pressurizing fan. Thus, with the fan having a delivery of 1,000 cubic feet per minute, two 18 inch vents are adequate at an internal pressurization of 0.6 inches of water to exceed the delivery of the fan.

To reinforce the airship envelope material, a circular reinforcing web 24 is sewn around the edge of the port. Cross webs, such as 25 and 26, extend laterally across the port and fore and aft respectively. These straps or webs are not joined at their intersection so as to permit spreading them. The 18 inch hole will permit access of the head and body of an operator for manual inspection of the interior of the airship on the ground.

The vent port is covered by a flexible cover 27 which is of adequate size to fully cover the port 23. The cover 27 is located within the envelope so that the pressure of the hot air within will hold it against the opening of the port 23. The flexible cover is sewn by stitching 29 at one end to the airship envelope so as to anchor it in position. The free end 28 can be drawn back across the port 23 to open it a controlled amount. The material of the cover 27 may be the same material as the airship envelope and being flexible, it gathers or shirrs as it is pulled to open position across the opening. For this purpose, reinforcing straps 30 and 31 are sewn along both lateral edges of the cover, and a strap 38 is sewn down the center. Opening lines 32 and 33 at the edges, and 36 in the center, lie along the cover and attach to rings 34, 35 and 37 respectively. These opening lines join at 41 to the main opening line 20 which leads to the gondola. Guide rings 39 and 40 are sewn to the straps to hold the opening lines in position and prevent any entanglement when the cover is drawn in an opening direction.

Strengthening patches 42 and 43 are sewn to the inner surface of the airship envelope and have line guiding rings 44 and 45 for guiding the opening lines 32 and 33 respectively. Another similar patch 46 has a line guiding ring 47 for the main opening line 20 to lead it back to the gondola.

The cover is biased toward closed position by elastic "bungy" cords 48, 49 and 50. The outer cords 48 and 49 extend laterally outwardly to pull the corners of the closing cover outwardly to cause it to lie smoothly and taut across the port 23. The outer ends of the outer cords 48 and 49 are secured to rings 54 and 55 on patches 51 and 52 sewed to the interior of the airship envelope. The center cord 50 is connected at its outer end to a ring 56 carried on a patch 53 on the inner surface of the airship envelope. As the cover is pulled in an opening direction, the elastic cords 48, 49 and 50 stretch, and as the opening line 20 is released, the elastic cords will draw the cover back over the port. Thus, the pilot need merely release the opening lines for the vent openings to automatically close, and any failure of the control lines will result in the elastic cords automatically closing the ports In flight the operator, from his position on the gondola, may desire to increase the free lift whereupon he draws both vent control lines 20 and 21 toward him to open the vents. This will dump cooler air from the airship envelope causing a more rapid entry of heated air into the envelope. In some circumstances, such as during ascent from the ground, the vents can be maintained open a predetermined controlled amount for continued dumping of cooler air. In flight the operator selectively opens either the forward or the aft vent. Opening of the forward vent will dump the cooler air from the forward end, and the resultant flow of heated air to the forward end of the airship envelope will cause the forward end to rise to encourage an ascending flight of the airship. Similarly, dumping of the cooler air through the aft vent, will cause a movement of hot air toward the aft end of the airship to give it more lift, and with the rising of the aft end, the airship will tend to travel in a descending direction. Various control combinations can be achieved by operating the vents in combination with the elevating fins on the airship or the burner and pressurizing fan. Improved control and improved safe operation is afforded in accordance with the structure and method provided.

I claim as my invention:

1. A thermal airship comprising in combination:
   an elongate gas envelope aerodynamically shaped for horizontal flight;
   hot air pressure generating means comprising a fan and burner carried by the envelope which draws and heats air from a surrounding atmosphere for pressurizing the envelope with heated air during flight, said heated air supplying approximately the entire free lift for the airship;
   tail members on the aft end of the airship for controlling the horizontal flight;
   a gondola carried below the envelope for supporting a payload;
   power propelling means carried by the envelope for propelling the airship horizontally;
   and vent means for over-pressure control and ascent and descent maneuvering in the balloon envelope including a port having a movable cover thereon and means for opening and closing the port a controllably variable amount, said vent means being located on the bottom of the envelope so as to permit cooler portions of the pressurizing air adjacent the bottom of the envelope to escape to the surrounding atmosphere.

2. A thermal airship constructed in accordance with claim 1:
   wherein said cover is flexible and draws laterally across the port.

3. A thermal airship constructed in accordance with claim 2:
   wherein said cover is inside the balloon envelope.

4. A thermal airship constructed in accordance with claim 1:
   including means biasing the cover to a closed position.

5. A thermal airship constructed in accordance with claim 1:
   wherein said cover is of flexible material within the airship envelope and is secured at one end alongside the port with elastic cords attached to a free end urging the cover to closed position and pull lines attached to said free end for moving the cover toward open position.

6. A thermal airship constructed in accordance with claim 1:
   wherein said port is of a size to permit the flow of air from the airship in a volume at least equal to the output of said hot air pressure generating means.

7. A thermal airship constructed in accordance with claim 1:
   wherein said hot air pressure generating means has an output in the range of 5,000 to 15,000 cubic feet per minute and the size of said port is such to permit a flow of gas from the envelope at a rate equal to the output of the generating means.

8. A thermal airship constructed in accordance with claim 1:
   including strap means extending laterally across said port at angles to each other with said strap means being free of attachment to each other for separation for manual inspection of the interior of the envelope.

9. A thermal hot air airship comprising in combination:
   an elongate non-rigid gas envelope aerodynamically shaped for horizontal flight;
   hot air pressure generating means carried on the envelope which draws and heats air from surrounding atmosphere for pressurizing the envelope with heated air during flight delivering heated air to the envelope interior intermediate the fore and aft end;
   a gondola carried below the envelope for carrying a payload;
   power propelling means carried by the envelope for moving the airship horizontally;
   a first vent means having a port in a bottom portion of the envelope in the forward end of the airship controllably openable to vent cooler portions of the pressurizing air adjacent the bottom portion of the airship to the surrounding atmosphere for causing heated air to move forwardly to increase the lift at the forward end;
   and a second vent means in a bottom portion of the envelope having a port in the aft end of the airship controllably openable to vent cooler air adjacent the bottom portion of the airship to the surrounding atmosphere for carrying heated air to the aft end to increase the lift at the aft end.

10. A thermal airship constructed in accordance with claim 9:
    wherein each of said first and second vent means are controllably variable in size for independently and variably controlling the lift at the forward and aft end of the airship.

11. A thermal airship constructed in accordance with claim 9:
    wherein each of said vent means has a flexible cover within the envelope movable laterally across a port in the envelope.

12. In a thermal hot air airship having an elongate gas envelope aerodynamically shaped for horizontal-flight, tail members, a gondola below the envelope, power propelling means on the envelope, pressure generating means, the method of controlling the ascending and descending angle of flight by the steps:
    delivering hot pressurized air to substantially the center of lift between the fore and aft ends and selectively venting cooler air from the airship envelope at the fore and aft end for causing a flow of the heated air toward the vented end to replace the vented cooler air and increase the lift at said vented end.

13. The method of controlling the angle of ascent and descent of an envelope in accordance with the steps of claim 12:
    wherein gas is vented at a controllably variable rate with the rate at each end independent of the other end.

14. The method of controlling the angle of ascent and descent of an envelope in accordance with the steps of claim 12:
    wherein gas is released from both ends at a maximum rate equal to the rate of delivery of hot air into the airship envelope.

* * * * *